3,376,280
DISAZO DYESTUFFS CONTAINING A 1,3-BENZO-DIOXANE GROUP

Alois Gottschlich and Karl-Heinz Freytag, Leverkusen, Germany, assignors to Farbenfabriken Bayer Aktiengesellschaft, Leverkusen, Germany, a corporation of Germany
No Drawing. Filed Jan. 18, 1965, Ser. No. 426,430
Claims priority, application Germany, Jan. 28, 1964, F 41,849
13 Claims. (Cl. 260—152)

ABSTRACT OF THE DISCLOSURE

An azo dyestuff of the formula:

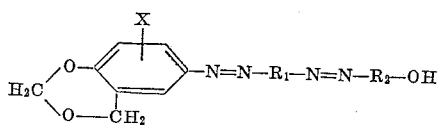

wherein $R_1$ is a residue of the benzene or naphthalene series joined to the two azo groups in p-positions, $R_2$ is a residue of the benzene series in which the OH group is in the o- or p-position to the azo bridge, X is a nonionic substituent customarily employed in dyestuffs.

DISCLOSURE

The present invention relates to novel azo dyestuffs; more particularly it relates to new azo dyestuffs which are free from sulphonic acid and carboxylic acid groups and which correspond to the formula

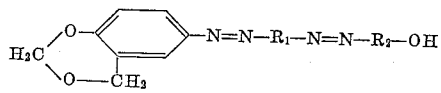

(I)

In this formula $R_1$ stands for a radical of the benzene or naphthalene series wherein the azo groups are linked in the p-position to one another, and $R_2$ represents a radical of the benzene series in which the OH group stands in the o-position or preferably in the p-position to the azo group; the residues $R_1$ and $R_2$ as well as the left-hand phenylene residue may contain non-ionic substituents customary in azo dyestuffs, such as halogen, especially fluorine, chlorine and/or bromine, further alkyl groups, particularly lower alkyl groups having 1 to 5 carbon atoms, such as methyl, ethyl, propyl, isopropyl, butyl, isobutyl and amyl, lower alkoxy groups having 1 to 4 carbon atoms, such as methoxy, ethoxy and propoxy, nitro, cyano, trifluoromethyl, optionally substituted sulphonamide and carbonamide groups, sulphonic acid lower alkyl ester and carbo lower alkoxy groups having 1 to 3 carbon atoms in the alkyl radical; the radicals $R_1$ and $R_2$ as well as the left-hand phenylene nucleus may contain 1, 2 or 3 of those non-ionic substituents.

In certain embodiments of this invention the novel azo dyestuff has the formula:

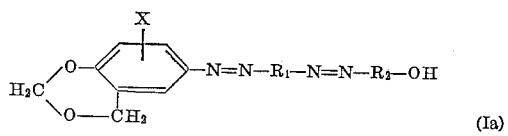

(Ia)

wherein $R_1$ and $R_2$ have the meanings recited above and X is hydrogen, lower alkyl, lower alkoxy, or halogen, specifically chlorine or bromine. In preferred embodiments of this invention the dyestuff has either of the formulas:

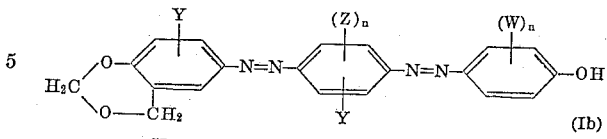

(Ib)

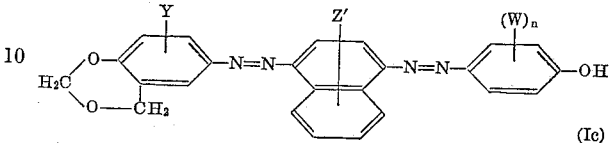

(Ic)

wherein Y is hydrogen, methyl, or chlorine, Z is hydrogen, methyl, or methoxy, Z' is hydrogen, methoxy, hydroxy, or ethoxy, W is hydrogen, methyl, methoxy, or methyl carboxy, and $n$ is the integer 1 or 2.

The new disazo dyestuffs are obtained when a diazotised amino-monoazo dyestuff of the formula

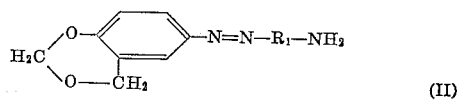

(II)

wherein $R_1$ has the same meaning as above and wherein the amino group in $R_1$ stands in the p-position to the azo group, is coupled with a phenol in the o-position or, preferably, in the p-position to the hydroxyl group, and the starting components are selected so that they are free from sulphonic acid and carboxylic acid groups.

Coupling of the starting components is preferably carried out in an alkaline medium and optionally in the presence of a coupling accelerator, e.g., formamide, dimethyl formamide or pyridine.

The amino-monoazo dyestuffs (II) are produced in the usual manner by coupling diazotised aminobenzodioxans-(1,3) with aminobenzenes or aminonaphthalenes in the p-position to the amino group.

Suitable diazo components for the synthesis of the amino-monoazo dyestuffs (II) are, for example, 6-aminobenzodioxan-(1,3), 6-amino-7-methyl-benzodioxan-(1,3), 6 - amino - 8 - methyl - benzodioxan-(1,3), 6-amino-7-methoxy - benzodioxan - (1,3), 6-amino-7-chloro- or-bromobenzodioxan - (1,3) and 6 - amino-8-chloro-benzodioxan-(1,3). The aforesaid aminobenzodioxans can be produced, for example, according to W. Borsche and A. D. Berkhout (Annalen der Chemie 330 [1904], page 82), by condensing 4-nitro-1-hydroxybenzene or its nuclear-substituted derivatives with 2 mol formaldehyde and reducing the resultant 6-nitrobenzodioxans-(1,3) to the 6-amino compounds. Suitable coupling components $R_1$-$NH_2$ are, inter alia, aniline, 1-amino-3-methylbenzene, 1-amino 3,5- and 3,6 - dimethylbenzene, 1 - amino - 2-methoxy-5-methylbenzene, 1 - amino-3-methoxybenzene, 1-amino-3, 6 - dimethoxybenzene, 1 - amino - 3,6-diethoxybenzene, 1-amino - naphthalene, 1 - amino - 2-ethoxynaphthalene, 1-amino - 5 - hydroxy-naphthalene, 1-amino-5,6,7,8-tetrahydronaphthalene.

The following phenols and phenol derivatives can be used for coupling with the diazo compounds of the amino-monoazo components (II), for example: phenol, 1 - hydroxy - 2 - methylbenzene, 1 - hydroxy - 3 - methylbenzene, 1 - hydroxy - benzene - 2 - carboxylic acid methyl ester, 1 - hydroxy - benzene - 2 - carboxylic acid ethyl ester, 1 - hydroxy - 2 - methoxybenzene, 1 - hydroxy - 4-methylbenzene, 1 - hydroxy - 3 - methoxybenzene, 1 - hydroxy - 3 - chlorobenzene, 1 - hydroxy - 3,5- and -3,6-dimethylbenzene, 1 - hydroxy - 3 - methyl - 5 - ethylbenzene and 1 - hydroxy - 3 - methyl - 5 - isopropylbenzene.

The new dyestuffs (I) are valuable products which are especially suitable for the dyeing and printing of fibres and fabrics of hydrophobic materials, preferably of aromatic polyesters, such as polyethylene terephthalates and polyesters from terephthalic acid and 1,4 - bis - hydroxymethyl - cyclohexane, and materials of 2½- and triacetate. Yellow, orange and red to brown shades are obtained which are distinguished by good fastness properties, such as fastness to light and sublimation, ironing and wet processing. The dyestuffs are also eminently suitable for the dyeing and printing of synthetic superpolyamide and polyurethane fibres. The novel dyestuffs are further distinguished by their excellent drawing power on fibrous materials of aromatic polyesters.

The following examples are given for the purpose of illustrating the invention.

EXAMPLE 1

26.9 parts by weight of the amino - monoazo dyestuff obtainable in the usual manner from diazotised 6 - aminobenzo - dioxan - (1,3) and 1 - amino - 3 - methylbenzene, are suspended in 600 parts by volume of water, followed by the addition of 28 parts by volume of concentrated hydrochloric acid. Diazotisation is then carried out in the usual manner with 24 parts by volume of a 30% aqueous sodium nitrite solution. The diazotised monoazo dyestuff slowly dissolves. This aqueous solution is clarified and added to a soda-alkaline solution of 9.4 parts by weight of hydroxybenzene in 180 parts by volume of water, whereupon a precipitate separates. After completion of the coupling, the resultant disazo dyestuff is filtered off with suction and washed. The dyestuff obtained corresponds to the formula

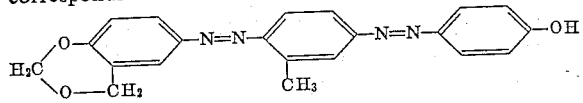

and dyes materials of polyethylene terephthalate fibres and polyesters from terephthalic acid and 1,4 - bis - hydroxy - methylcyclohexane, and materials of polyamides and 2½- and triacetyl cellulose in strongly yellowish orange shades with good fastness properties.

EXAMPLE 2

31.5 parts by weight of the amino - monoazo dyestuff obtainable in the usual manner from diazotised 6 - aminobenzo - dioxan - (1,3) and 1 - amino - 2,5 - dimethoxybenzenes, are suspended in 600 parts by volume of water, followed by the addition of 28 parts by volume of concentrated hydrochloric acid.

Diazotisation is then carried out in the usual manner with 24 parts by volume of a 30% aqueous sodium nitrite solution. The diazotised monoazo dyestuff slowly dissolves. This aqueous solution is clarified and added to a soda - alkaline solution of 9,4 parts by weight of hydroxybenzene in 180 parts by volume of water, whereupon a precipitate separates. After completion of the coupling, the resultant disazo dyestuff is filtered off with suction and washed. The dyestuff obtained dyes materials of polyethylene terephthalate fibres and polyesters from terephthalic acid and 1,4 - bis - hydroxy - methyl - cyclohexane, and materials of polyamide and acetylated cellulose in reddish orange shades with good fastness properties.

By using equivalent amounts of the starting components given in the following table and proceeding otherwise in analogy with the instructions of Example 1 or 2, valuable disazo dyestuffs are also obtained, which dye polyester, polyamide and acetate fibres in the stated shades.

| Diazo component | 1st Coupling component | 2nd Coupling component | Shade |
|---|---|---|---|
| 6-aminobenzodioxan-(1,3) | 1-amino-3-methylbenzene | 1-hydroxy-3-methylbenzene | Strongly yellowish orange. |
| Do | do | 1-hydroxy-2-methylbenzene | Strongly reddish yellow. |
| Do | do | 1-hydroxybenzene-2-carboxylic acid methyl ester | Yellowish orange. |
| Do | do | 1-hydroxy-4-methylbenzene | Reddish yellow. |
| 6-amino-7-methyl-benzo-dioxan-(1,3) | 1-amino-2-methoxy-5-methylbenzene | 1-hydroxybenzene-2-carboxylic acid ethyl ester | Orange. |
| 6-aminobenzodioxan-(1,3) | 1-amino-3,5-dimethyl-benzene | 1-hydroxy-benzene | Yellowish orange. |
| Do | do | 1-hydroxy-2-methylbenzene | Do. |
| Do | do | 1-hydroxy-3-methylbenzene | Do. |
| 6-amino-8-methyl-benzodioxan-(1,3) | 1-amino-3-methylbenzene | Hydroxybenzene | Do. |
| 6-amino-7-chloro-benzo-dioxan-(1,3) | do | do | Reddish yellow. |
| 6-aminobenzodioxan-(1,3) | 1-amino-3-methoxybenzene | do | Do. |
| Do | do | 1-hydroxy-2-methylbenzene | Strongly yellowish orange. |
| Do | do | 1-hydroxy-3-methylbenzene | Do. |
| Do | do | 1-hydroxy-2,5-dimethyl-benzene | Do. |
| Do | do | 1-hydroxybenzene-2-carboxylic acid ethyl ester | |
| | do | 1-hydroxy-3,5-dimethylbenzene | Orange. |
| Do | do | 1-hydroxy-3-methoxybenzene | Do. |
| Do | 1-amino-3-methy.benzene | do | Yellowish orange. |
| Do | do | 1-hydroxy-3,5-dimethylbenzene | Do. |
| Do | do | 1,3-dihydroxybenzene | Yellow-brown. |
| Do | 1-amino-2,5-dimethylbenzene | 1-hydroxy-3-methylbenzene | Orange. |
| Do | 1-amino-2-methoxy-5-methylbenzene | Hydroxybenzene | Yellowish orange. |
| Do | do | 1-hydroxy-2-methylbenzene | Orange. |
| Do | do | 1-hydroxy-3-methylbenzene | Do. |
| Do | do | do | Reddish orange. |
| Do | 1-amino-2,5-dimethoxybenzene | 1-hydroxy-3-methoxybenzene | Red. |
| Do | do | Hydroxybenzene | Orange. |
| Do | 1-aminonaphthalene | 1-hydroxy-3-methylbenzene | Reddish orange. |
| Do | do | 1-hydroxy-3,5-dimethylbenzene | Do. |
| Do | do | 1-hydroxy-3-methoxybenzene | Strongly reddish orange. |
| Do | do | Hydroxybenzene | Red. |
| Do | 1-amino-2-methoxynaphthalene | 1-hydroxy-2,5-dimethylbenzene | Orange. |
| Do | 1-amino-2,5-dimethoxybenzene | 1-hydroxy-3-methoxybenzene | Red. |
| Do | do | Orange. | |
| Do | 1-aminonaphthalene | 1-hydroxy-2-methylbenzene | Orange. |
| Do | 1-amino-3-methylbenzene | 1-hydroxy-2,5-dimethylbenzene | Yellowish orange. |
| Do | 1-amino-2,5-dimethylbenzene | Hydroxybenzene | Do. |
| Do | do | 1-hydroxy-2-methylbenzene | Do. |
| Do | do | 1-hydroxy-3,5-dimethylbenzene | Do. |
| Do | do | 1-hydroxy-2,5-dimethylbenzene | Reddish yellow. |
| Do | do | 1-hydroxy-3-methoxybenzene | Orange. |
| Do | do | 1-hydroxybenzene-2-carboxylic acid methylester | Reddish yellow. |
| | | 1,3-dihydroxybenzene | Orange. |
| Do | 1-amino-2-methoxy-5-methylbenzene | 1-hydroxy-2,5-dimethylbenzene | Yellowish orange. |
| Do | do | 1-hydroxy-3,5-dimethylbenzene | Do. |
| Do | do | 1-hydroxy-3-methoxybenzene | Scarlet. |
| Do | do | 1,3-dihydroxybenzene | Red. |
| Do | do | 1-hydroxybenzene-2-carboxylic acid methylester | Yellowish orange. |

We claim:
1. An azo dyestuff of the formula

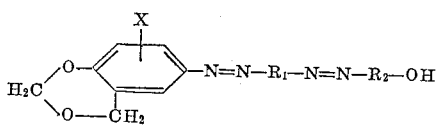

wherein $R_1$ stands for a residue selected from the class consisting of residues of the benzene and naphthalene series and joined to the two azo groups in p-positions, $R_2$ stands for a residue of the benzene series in which the OH group is in the o- or p-position to the azo bridge, X stands for a member selected from the class consisting of hydrogen, lower alkyl, lower alkoxy, chlorine and bromine; the dyestuff being free of sulfonic and carboxylic acid groups.

2. A dyestuff of the formula

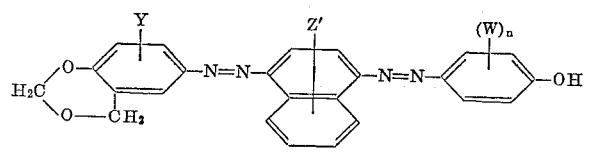

wherein Y stands for a member selected from the class consisting of —H, —CH$_3$, and —Cl, Z' stands for a member selected from the class consisting of —H, —OCH$_3$, —OH, and —OC$_2$H$_5$, W stands for a member selected from the class consisting of —H, —CH$_3$, —OCH$_3$, and —COOCH$_3$, and $n$ stands for an integer ranging from 1 to 2.

3. A dyestuff of the formula

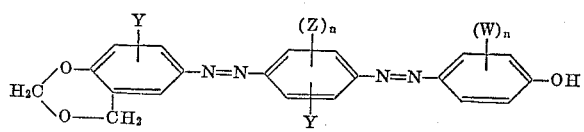

wherein Y stands for a member selected from the class consisting of —H, —CH$_3$ and —Cl, Z stands for a member selected from the class consisting of —H, —CH$_3$ and —OCH$_3$, $n$ stands for an integer ranging from 1 to 2, and W stands for a member selected from the class consisting of —H, —CH$_3$, —OCH$_3$ and —COOCH$_3$.

4. The dyestuff of the formula

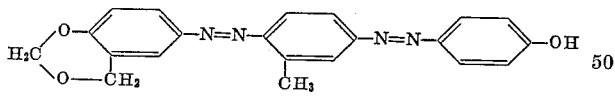

5. The dyestuff of the formula

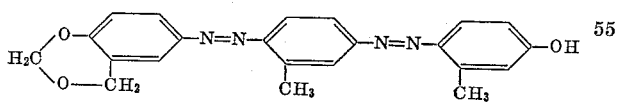

6. The dyestuff of the formula

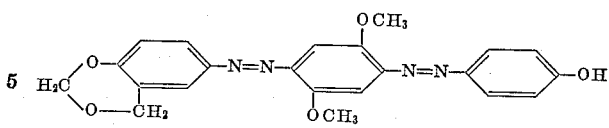

7. The dyestuff of the formula

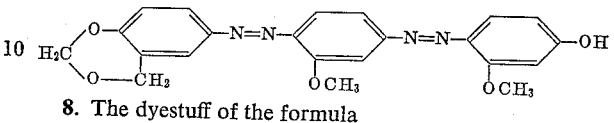

8. The dyestuff of the formula

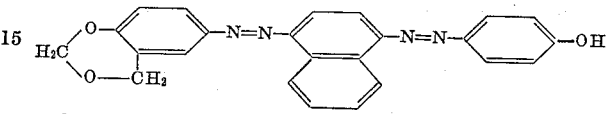

9. The dyestuff of the formula

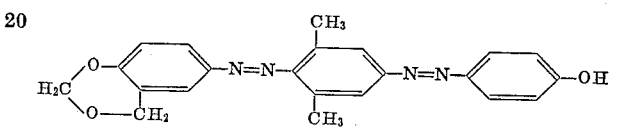

10. The dyestuff of the formula

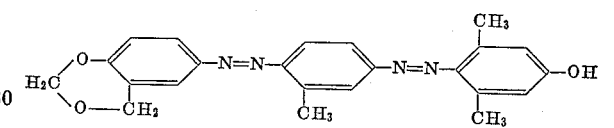

11. The dyestuff of the formula

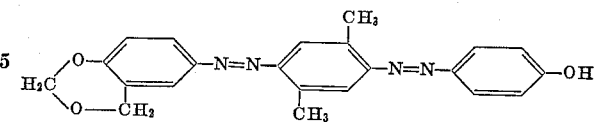

12. The dyestuff of the formula

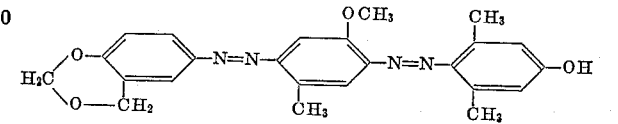

13. The dyestuff of the formula

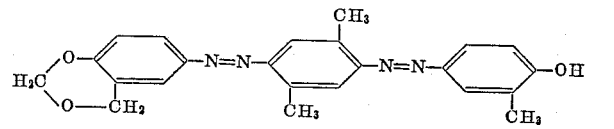

References Cited
UNITED STATES PATENTS
2,391,137  12/1945  Danuser et al. _____ 260—152
2,468,277  4/1949  Strouse _____ 260—152

FLOYD D. HIGEL, *Primary Examiner.*